Figure 1:
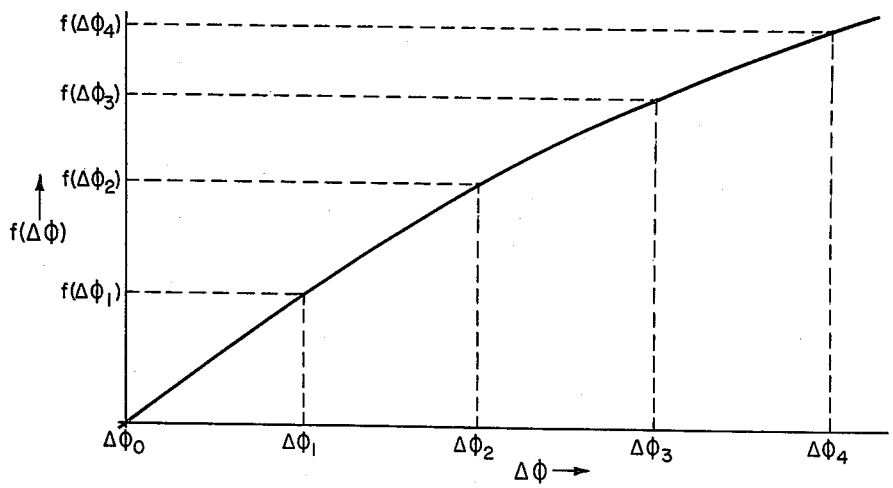

INVENTORS
JOSEPH R. VADUS
JACK A. TAYLOR

United States Patent Office 3,080,555
Patented Mar. 5, 1963

3,080,555
FUNCTION GENERATOR
Joseph R. Vadus, Carle Place, and Jack A. Taylor, Westbury, N.Y., assignors to Sperry Rand Corporation, a corporation of Delaware
Filed June 12, 1958, Ser. No. 741,487
6 Claims. (Cl. 343—5)

The present invention generally relates to function generators. More particularly, it is concerned with a function generator which is adapted to receive a succession of discrete signals, each representing a predetermined incremental change of an input quantity, and which is operative to produce an output signal representing the value of a predetermined function of said input quantity.

One of the function generator techniques well known in the art involves the synthesis of a predetermined function by the end-to-end joining of a plurality of straight line segments of individual slope. In this manner, a curve which is a plot of the values of a dependent variable may be closely approximated by means of a sufficient number of straight line segments, each segment having a length corresponding to a preselected increment of the independent variable and having a slope conforming to that of the corresponding average values of the dependent variable. This technique is popularly known as "curve matching" by means of straight line segments.

The complexity of curve matching function generators is related to the nature of the function to be synthesized. In the case of certain functions wherein the values of the dependent variable follow a relatively smooth curve, it has been found that a sufficiently close approximation of the desired function can be accomplished by utilizing a succession of straight line segments having lengths corresponding to equal valued increments of the independent variable. A substantial reduction in the complexity of the function generator is realized when equal-valued increments of the independent variable are employed. Another factor which influences complexity is the nature of the independent variable. For example, it is usually simpler to instrument a function generator when the independent variable is linearly related to time as opposed to when it is linearly related to displacement.

It is the general object of the present invention to provide a function generator employing digital techniques for the determination of straight line segments for curve matching purposes.

A further object is to provide a function generator adapted to receive a signal representing equal incremental changes of an independent variable having the dimension of displacement.

Another object is to provide a single digital computing element for performing the dual functions of determining the terminal points and slope of each of a plurality of straight line segments for the synthesis of a predetermined function.

These and other objects of the present invention, as will appear to those skilled in the art from a reading of the following specification, are accomplished by the provision of a pulse counter whose lower order digit stages and higher order digit stages are separately employed for the synthesis of a predetermined function. Pulsed signals representing incremental changes in the value of the independent variable are applied to the least significant digit place of the lower order digit stages. The numerical capacity of the lower order stages is made equal to a preselected number of increments of the independent variable over which each individual straight line portion of the synthesized function is of a predetermined slope. The numerical capacity of the higher order stages is made equal to the number of straight line segments which comprise the synthesized function.

Digital-to-analog conversion means are connected to the lower order stages to produce an output signal representing the value of a number stored in the lower order stages. The analog output signal is applied to a first input of a switching network. The switching network comprises a plurality of switching means equaling in number the number of the aforesaid higher order digit stages of the counter. Also provided are a plurality of slope-adjusting coupling means equaling in number the number of straight line segments comprising the synthesized function. Each switching means is energized in response to a predetermined state of a respective one of the higher order digit stages of the counter. A reference signal source is also connected to the input of the switching means.

In accordance with the digits stored in the higher order stages of the counter, the analog and the reference signals are coupled to the input terminals of predetermined ones of the slope-adjusting coupling means. The output terminals of the coupling means are commonly connected together to form the output terminal of the function generator.

Figure 2:
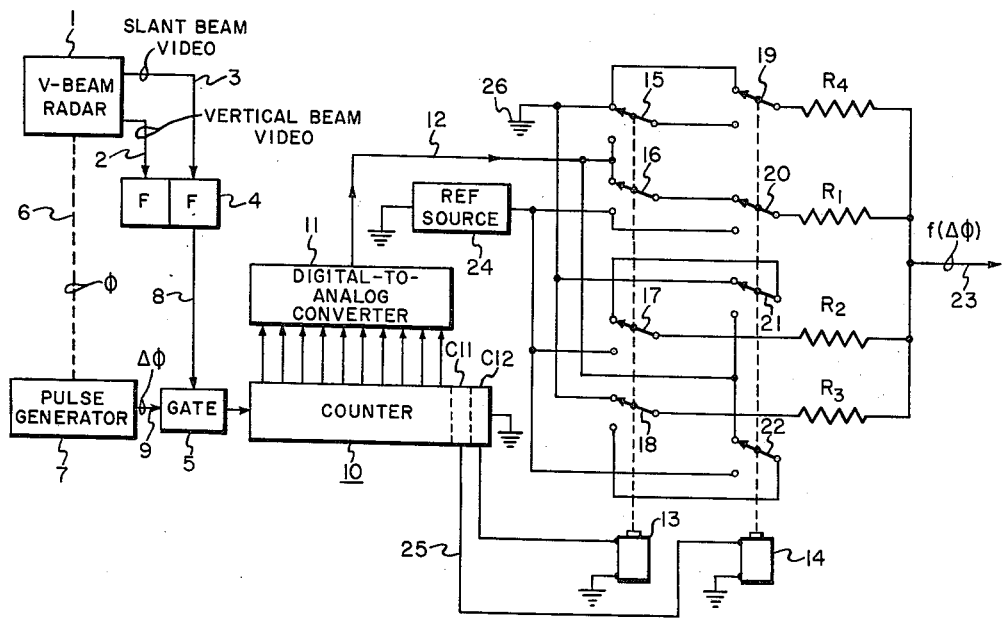

In the drawings,

FIG. 1 is a plot of a representative function generated by the apparatus of the present invention and useful in a V-beam radar height computer; and FIG. 2 is a block diagram, partially schematic in form, of a representative embodiment of the present invention adapted to receive pulsed input signals derived from a V-beam radar system.

The advantages of the function generator of the present invention are particularly well suited to the computation of target height based on target data signals generated by a V-beam radar. A description of a typical V-beam radar system is given on pages 192–196 of vol. 1 of the Radiation Lab. Series, entitled "Radar System Engineering," edited by Louis N. Ridenour, and published by McGraw-Hill Book Company, Inc., 1947. Briefly stated, a V-beam radar utilizes two antennas for the generation of vertical and slant sheet beams of microwave energy in space. The configuration of the beams in space is in the form of the letter V. Both antennas are caused to rotate together in azimuth. A first video pulse is generated when the vertical beam is swept by the azimuth position of a reflecting target. At a later time, depending on the range and height of the target above the bottom of the V, the target is illuminated by the slant beam and a second video pulse is produced.

The azimuth turn angle through which the antennas are azimuthally displaced, in order to successively illuminate the target by the vertical and slant beams, is related to target height and target range. The target height may be computed with the aid of the turn angle and target range data generated by the V-beam radar in accordance with the following expression:

$$h = \frac{R \sin \Delta\phi}{\sqrt{1+\sin^2 \Delta\phi}}$$

wherein $\Delta\phi$ represents the turn angle in degrees and R represents target range as measured in miles. This expression applies where the angle formed by the intersecting vertical and slant beams is 45°.

In accordance with present day practice, target height is computed by first producing a signal representing $$\frac{h}{R}$$

proportional to:

$$\frac{\sin \Delta\phi}{\sqrt{1+\sin^2 \Delta\phi}}$$

and then multiplying said signal by a second signal proportional to target range. FIG. 1 is a representative plot of the expression:

$$\frac{h}{R} = \frac{\sin \Delta\phi}{\sqrt{1+\sin^2 \Delta\phi}}$$

as a function of $\Delta\phi$. The function generator of the present invention is readily adapted to the generation of a signal representing the function plotted in FIG. 1.

By inspection of FIG. 1, it will be seen that the entire curve may be closely approximated by four straight line segments terminating at the values of the dependent variable corresponding to $f(\Delta\phi_1)$, $f(\Delta\phi_2)$, $f(\Delta\phi_3)$, and $f(\Delta\phi_4)$.

A preferred embodiment of the present invention for synthesizing the function plotted in FIG. 1, is shown in FIG. 2. A V-beam radar system is generally represented by the numeral 1. The V-beam radar system per se forms no part of the present invention and for this reason is not shown in detail. Radar 1 produces one mechanical signal and two electrical signal outputs. The electrical signal outputs consist of first and second video pulses, each of which is generated by the occurrence of a target signal in a respective one of the vertical beam and slant beam channels of the radar. The direction of rotation of the V-beam antennas is such that the target azimuth position is first intercepted by the vertical beam and then by the slant beam. The vertical beam pulse appears on line 2 while the slant beam pulse appears on line 3. Lines 2 and 3 are connected to respective reset input terminals of flip-flop 4. Flip-flop 4 is placed into respective predetermined ones of its bistable conditions in response to the pulses applied via lines 2 and 3. The output signal of flip-flop 4 is applied to the control input of electronic gate 5.

The mechanical signal output of radar 1 is in the form of the displacement of shaft 6 which represents the azimuth position of the V-beam antennas. Shaft 6 is connected to and activates pulse generator 7. Pulse generator 7 produces in a conventional manner an output pulse each time that shaft 6 has been displaced through a predetermined incremental angle. Upon the occurrence of a vertical-beam pulse on line 2, flip-flop 4 is placed into such a state of conduction that the output signal on line 8 renders gate 5 conductive. Flip-flop 4 is placed into its opposite condition by the occurrence of a slant-beam pulse on line 3. The number of pulses on line 9 which flow through gate 5 is a measure of the magnitude of the angular displacement of shaft 6 intervening the occurrence of the vertical and slant-beam pulses. Thus, the number of pulses passed by gate 5 is a measure of the turn angle traversed by the V-beam antennas of radar 1 intervening the successive illuminations of the target by the vertical and slant beams of microwave energy.

The pulses at the output gate 5 are applied to the input to the function generator of the present invention, the input corresponding to the lowest order digit place of a conventional counter 10. In the illustrative case of FIG. 2, counter 10 contains, for example, twelve stages each representing a respective digit place of a binary number. Signals are derived from the first ten digit places (lower order stages) of counter 10 and are applied to the input of digital-to-analog converter 11. Converter 11 may comprise a conventional conversion network consisting of switches and binary-weighted summing resistors for the generation of an output signal on line 12 having an amplitude representing the magnitude of the number contained in the first ten digit places of counter 10.

Each of the higher order digit places $C_{11}$ and $C_{12}$ of counter 10 produces an output signal for the energization of a respective one of relays 13 and 14. As previously mentioned, the numerical capacity of the higher order digit places of counter 10 is made equal to the number of straight line segments to be used in the synthesis of the desired function. Accordingly, counter 10 includes said two digit places inasmuch as four straight line segments as indicated in FIG. 1 are to be utilized.

Each of relays 13 and 14 positions a plurality of associated ganged switching members 15, 16, 17 and 18, and 19, 20, 21 and 22. The switching members are shown in their deactivated positions. A source of reference signal 24, ground 26, and line 12 are connected to predetermined ones of the input contact terminals as indicated in the figure. Resistors $R_1$, $R_2$, $R_3$, and $R_4$ interconnect associated ones of the output contact terminals and common output line 23. Said resistors comprise a conventional linear passive summing network. As is well known, the coupling factor between the voltage inputs to such summing resistors is minimized when the impedance of the load circuit to be driven thereby is very low relative to the values of the resistors. For example, such a relatively low load impedance may be realized readily by the provision of a conventional feedback or operational amplifier at the junction point of the summing resistors whereby each resistor may be adjusted substantially independently of the others to produce a signal representing the function plotted in FIG. 1 in the manner to be described.

The operation of the function generator of the present invention may be seen by reference to FIG. 2 with the aid of FIG. 1. Each time that shaft 6 is rotated through an incremental angle following the occurrence of vertical beam video and prior to the occurrence of slant beam video, a pulse is applied to the least significant digit place of counter 10. A signal is generated on line 12 at the output of converter 11 having an amplitude representing the number contained in the lower order stages of counter 10. For the first 1023 of the applied pulses, the signal on line 12 is connected through deactivated switching members 16 and 20 and resistor $R_1$ to output line 23. The value of resistor $R_1$ is so chosen that the linearly increasing signal of line 23 follows the slope of the curve of FIG. 1 in the interval between $\Delta\phi_0$ and $\Delta\phi_1$.

Upon the occurrence of the 1024th input pulse to counter 10, the numerical capacity of the last of the lower order stages is exceeded and a carry signal is produced which places the eleventh counter stage $C_{11}$ into a state of "one." The resulting signal on line 25 energizes relay 14 and places the ganged switching members 19, 20, 21 and 22 into their activated position which is opposite that shown. At the same time, the first ten stages of counter 10 are reset automatically to 0.

Upon the activation of members 19, 20, 21 and 22, line 12 is connected to resistor $R_2$, the reference source 24 is connected to resistor $R_1$, and resistors $R_3$ and $R_4$ are returned to ground. The signal output of source 24 is adjusted so that the signal at the output terminal of resistor $R_1$ is precisely equal to the maximum potential previously existing on output line 23 before relay 14 was energized. Consequently, when relay 14 becomes energized in response to the first carry signal from the tenth stage of counter 10, a reference voltage is applied to line 23 representing the value $f(\Delta\phi_1)$ of FIG. 1.

In the event that additional pulses are passed by gate 5 to counter 10, the signal appearing on line 12 again increases linearly. During this interval, the signal on line 23 linearly progresses between the value $f(\Delta\phi_1)$ and $f(\Delta\phi_2)$ of FIG. 1. Resistor $R_2$, to which is applied the signal on line 12, is adjusted in value to produce the slope of the function plotted in FIG. 1 corresponding to the values of the dependent variable between $f(\Delta\phi_1)$ and $f(\Delta\phi_2)$.

When the first numerical capacity of the lower order stages of counter 10 is exceeded a second time, a signal representing the binary value 0 appears in counter stage $C_{11}$ and a signal representing the binary value 1 appears in counter stage $C_{12}$. In this case, relay 13 is energized and relay 14 is deenergized. Upon the activation of ganged switching members 15, 16, 17 and 18 and the deactivation of ganged switching members 19, 20, 21 and 22, line 12 is connected to resistor $R_3$, reference source 24 is connected to resistors $R_1$ and $R_2$, and resistor $R_4$ is connected to ground. As a result, the reference voltage contributions of resistors $R_1$ and $R_2$ produce on output line 23 a signal representing the value $f(\Delta\phi_2)$ of the independent variable of FIG. 1.

As before, the first ten stages of counter 10 are automatically reset to 0 upon the occurence of the second carry pulse and the signal on line 23 increases linearly at a new slope determined by the value of resistor $R_3$ corresponding to the slope of the function plotted in FIG. 1 between the values $f(\Delta\phi_2)$ and $f(\Delta\phi_3)$.

The following table, when read along horizontal rows, summarizes the connections of line 12 (L), reference source 24 (S), and ground 26 (G) to respective ones of resistors $R_1$, $R_2$, $R_3$, and $R_4$ corresponding to the binary digits stored in counter stages $C_{11}$ and $C_{12}$.

| Stored Binary Digits | | Corresponding Connections | | | |
|---|---|---|---|---|---|
| $C_{11}$ | $C_{12}$ | $R_1$ | $R_2$ | $R_3$ | $R_4$ |
| 0 | 0 | L | G | G | G |
| 1 | 0 | S | L | G | G |
| 0 | 1 | S | S | L | G |
| 1 | 1 | S | S | S | L |

It will be seen that resistors $R_1$, $R_2$, $R_3$, and $R_4$ serve the dual function of establishing the slope of each straight line segment of the curve of FIG. 1 as well as determining the reference voltage values corresponding to the values of the dependent variables $\Delta\phi_1$, $\Delta\phi_2$, $\Delta\phi_3$, and $\Delta\phi_4$. This dual utilization of the resistors is made possible by the fact that the maximum amplitude of the signal on line 12 corresponds to the fixed numerical capacity of the lower order stages of counter 10. The value of the signal output of reference source 24 is adjusted to equal the maximum possible value of the signal appearing on line 12. Therefore, each time that a slope transition point is reached along the curve of FIG. 1, a reference voltage is applied to output line 23 which equals in magnitude the level of the signal on line 12 which existed just prior to said transition point.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A function generator comprising a pulse counter adapted to receive a plurality of discrete pulses each representing an incremental change in the value of an independent variable, said pulse counter having first and second different portions each representing different significant digits of the digital number appearing in said pulse counter, a digital-to-analog converter connected to said first counter portion for producing at an output terminal a signal representing the value of the number appearing in said first counter portion, a plurality of switching means each connected to a respective digit position of said second counter portion and responsive to a predetermined state of the respective digit position, a reference signal source, and a plurality of two terminal signal coupling impedance means, one terminal of each being commonly connected together, said plurality of switching means interconnecting the other terminals of said impedance means, said reference signal source and said output terminal in accordance with the value of the number stored in said second counter portion.

2. Apparatus for the synthesis of a predetermined function by means of a plurality of straight line segments, said apparatus being adapted to receive a succession of discrete pulsed signals, each signal representing an incremental change in the value of an independent variable, and operative to produce therefrom an output signal representing the value of said predetermined function of said independent variable, said apparatus comprising a pulse counter having lower order and higher order digit stages, the numerical capacity of said lower order stages being equal to a preselected number of increments of said independent variable and the numerical capacity of said higher order stages being equal to the number of said straight line segments for synthesizing said predetermined function, the least significant digit place of said lower order stages being adapted to receive said pulsed signals, a digital-to-analog converter connected to said lower order stages for producing a first signal representing the value of the number stored in said lower order stages, a switching network including a plurality of switching means equaling in number the number of said higher order stages, a plurality of two terminal signal coupling impedance means equaling in number the number of said straight line segments, each of said switching means being energized in response to a predetermined state of a respective one of said higher order stages, a reference signal source connected to said switching network, and means for applying said first signal to said switching network, said switching network connecting said first signal and reference signal to first terminals of said signal coupling impedance means in accordance with the states of said higher order stages, the other of said terminals of said signal coupling impedance means being connected together for developing said output signal.

3. Apparatus as defined in claim 2 wherein each of said two terminal signal coupling impedance means is a resistor whose resistance is related to the slope of a respective one of said straight line segments.

4. Apparatus as defined in claim 2 wherein said reference signal source produces a signal having an amplitude equal to the amplitude of said first signal corresponding to the maximum numerical capacity of said lower stages.

5. In a V-beam radar receiver, a function generator adapted to receive a sequence of pulses representing the antenna turn angle intervening the successive receptions of vertical beam and slant beam target signals, said function generator producing an output signal proportional to the ratio of target height to target range, said generator comprising a pulse counter having first and second different portions each representing different significant digits of the digital number appearing in said pulsed counter, said sequence of pulses being applied to the least significant digit place of said pulse counter, a digital-to-analog converter connected to said first counter portion for producing at an output terminal a signal representing the value of the number appearing in said first counter portion, a plurality of switching means each connected to a respective digit place of said second counter portion and responsive to a predetermined state of the respective digit place, a reference signal source, and a plurality of two terminal signal coupling impedance means, one terminal of each being commonly connected together for producing said output signal, said plurality of switching means interconnecting the other terminals of said coupling impedance means, said reference signal source and said output terminal in accordance with the value of the number appearing in said second counter portion.

6. In a V-beam radar receiver, a function generator adapted to receive a sequence of pulses representing the antenna turn angle intervening the successive reception of vertical beam and slant beam target signals, said generator synthesizing by means of a plurality of straight line signal segments an output signal representing a turn angle function proportional to the ratio of target height to target range, said generator comprising a pulse counter having lower order and higher order stages, the numerical capacity of said higher order stages being equal to the number of said segments, the least significant digit place of said lower stages being adapted to receive said sequence of pulses, a digital-to-analog converter connected to said lower order stages for producing a first signal representing the value of the number appearing in said lower order stages, a switching network including a plurality of switching means equaling in number the number of said higher order stages, a plurality of two terminal signal coupling impedance means equaling in number the number of said segments, each of said switching means being energized in response to a predetermined state of a respective one of said higher order stages, a reference signal source connected to said switching network, and means for applying said first signal to said switching network, said switching network connecting said first signal and reference signal to first terminals of said signal coupling impedance means in accordance with the states of said higher order stages, the other of said terminals of said signal coupling impedance means being connected together for developing said output signal.

References Cited in the file of this patent
UNITED STATES PATENTS
2,700,762    Lee _____ Jan. 25, 1955